Figure 1:
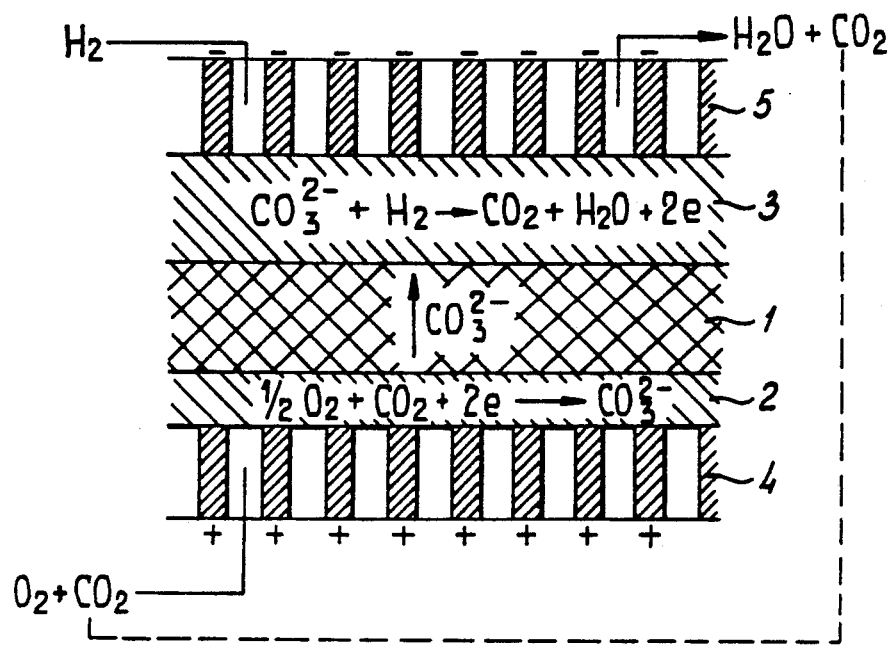

United States Patent [19]

Quaadvliet

[11] Patent Number: 5,084,364
[45] Date of Patent: Jan. 28, 1992

[54] SEPARATOR PLATE FOR USE IN A GAS FUEL CELL WHICH COMPRISES A SET OF ELECTRODES, AND ALSO A STACK OF FUEL CELLS

[75] Inventor: Henricus J. A. Quaadvliet, Groet, Netherlands

[73] Assignee: Stichting Energieonderzoek Centrum Nederland (ECN), Petten, Netherlands

[21] Appl. No.: 548,845

[22] Filed: Jul. 6, 1990

[30] Foreign Application Priority Data

Jul. 12, 1989 [NL] Netherlands .................. 8901800

[51] Int. Cl.$^5$ .................................. H01M 8/04
[52] U.S. Cl. ............................... 429/34; 429/38
[58] Field of Search ..................... 429/34, 38, 35

[56] References Cited

U.S. PATENT DOCUMENTS

| | | | |
|---|---|---|---|
| 4,431,714 | 2/1984 | Myerhoff | 429/26 |
| 4,514,475 | 4/1985 | Mientek | 429/35 |
| 4,588,660 | 5/1986 | Shimizu et al. | 429/35 |
| 4,604,331 | 8/1986 | Louis | 429/35 |
| 4,748,092 | 5/1988 | Hekal | 429/35 |

*Primary Examiner*—Anthony Skapars
*Attorney, Agent, or Firm*—Young & Thompson

[57] ABSTRACT

Separator plate for stacking fuel cells of the molten-carbonate type, provided with openings for fuel inlet and fuel outlet and for inlet and outlet of oxidizing agent, the gas passages through the separator plate having a spring characteristic as a result of choosing a suitable profile therefore and as a result of a frame-type spring which is disposed around the active cell assembly, which frame-type spring contains built-in components for conveying the process gases, and the profile of the frame spring is matched to the spring characteristic of the gas passage.

3 Claims, 4 Drawing Sheets

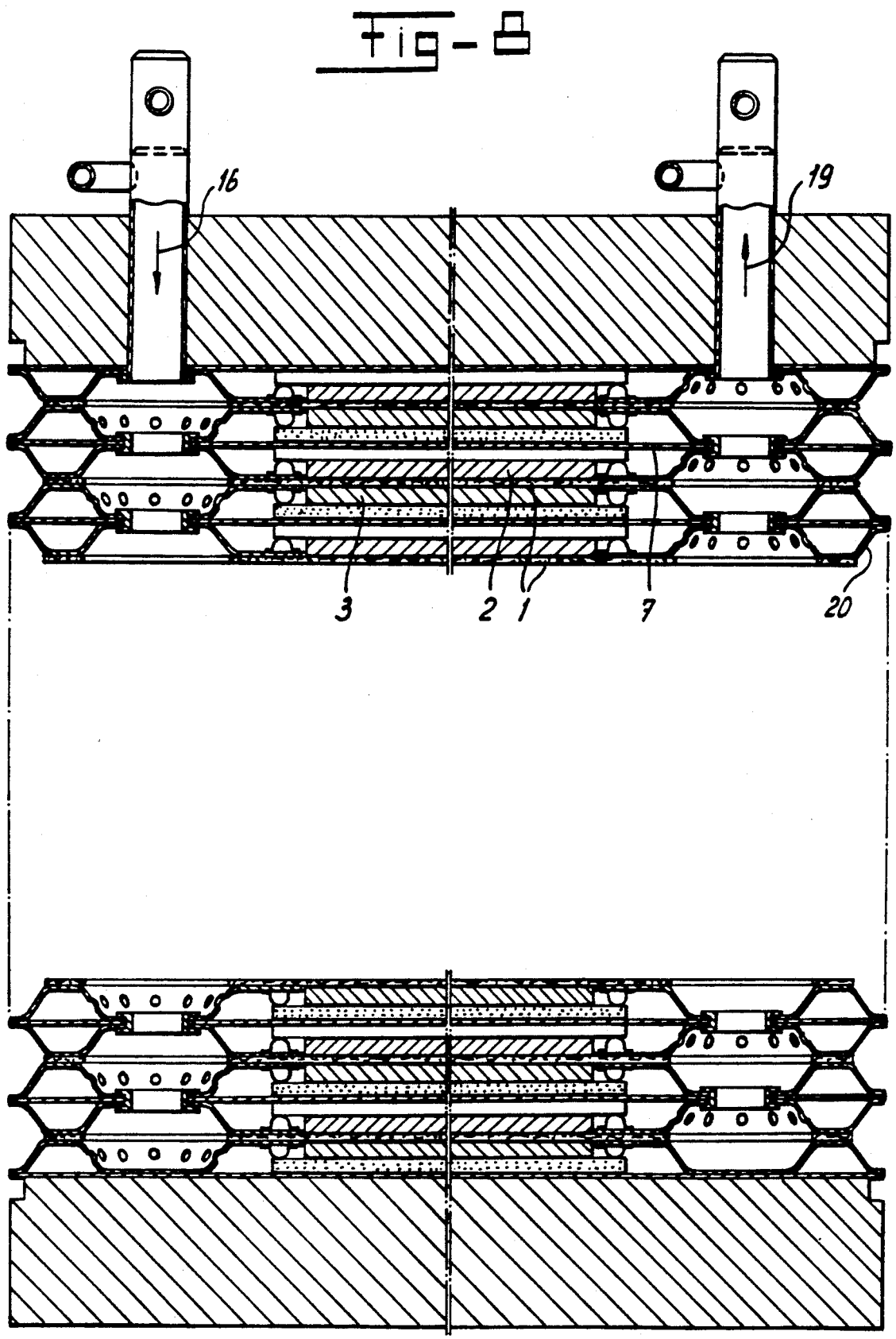

SEPARATOR PLATE FOR USE IN A GAS FUEL CELL WHICH COMPRISES A SET OF ELECTRODES, AND ALSO A STACK OF FUEL CELLS

The invention relates to a separator plate for stacking fuel cells of the molten-carbonate type, provided with openings for fuel inlet and fuel outlet and for inlet and outlet of oxidizing agent, and also to a stack of fuel cells of the molten-carbonate type which contain said separator plates.

Such a separator plate is disclosed in the U.S. Pat. No. 4,604,331 which describes a separator which is composed of a flat plate having two sealing flanges which are disposed on opposite sides and are bent back upwards and towards these themselves and are provided, at the two other sides, also situated opposite each other, of the plate with similar flanges which are, however, bent downwards. Each of the sealing flanges is composed of a flat wall which runs, at some distance from the plate, virtually parallel thereto and two side walls, folded in accordion fashion, of which one joins the flat wall to the plate and the other ends at a small distance from the plate, said side walls imparting a spring-type compressibility to the sealing flange in the direction generally perpendicular to the plane of the plate. Four corner elements close the ends of the sealing flanges.

U.S. Pat. No. 4,514,475 discloses a separator which is composed of a flat rectangular gas-impermeable which is placed between two consecutive cells, two oppositely situated sides being folded back over one side of the plate to form two sealing flanges, the two remaining sides being folded back over the opposite side of the plate to form two other sealing flanges, each of the sealing flanges forming, together with the plate, a channel in which a spring-type compressible bundle of thin metal layers is placed. The two first sealing flanges adjoin the electrolyte matrix of one of the cells to form a gas-impermeable seal between an electrode of a cell and of a ribbed plate for reactant gas. The second sealing flange adjoins the electrolyte matrix of the other cell to form a gas-impermeable seal between electrodes of the other cell and of the other ribbed channels for the reactant gas. The sealing flanges interact with compressible stacks, joined thereto, of sheets for maintaining a distance between the plate and the electrolyte matrices, while they make it possible to adjust the distance between the plates.

An important characteristic of the separators according to these two patent specifications resides in the fact that, in both cases, the process gases for the different fuel cells of a stack have to be supplied externally via gas chambers, situated jointly opposite each other, for the fuel in the one direction and for the stream of oxidizing agent in a direction perpendicular thereto.

More generally, fuel cells are known for generating energy by electrochemical combustion of oxygen. The advantage of this mode of combustion is the direct conversion into electricity in addition to heat as a consequence of the internal resistance in the (fuel) cell. As a result, process efficiencies of 60% and higher can be obtained. Although hydrogen is the fuel component in a fuel cell, it is also possible to use, inter alia, natural gas or coal gas as primary components.

The use of natural gas or coal gas requires conversion into a hydrogen-rich gas mixture by "reforming" or "chemical shift" reactions. These chemical reactions are endothermic and can be catalytically shifted at the working temperature of molten-carbonate fuel cell systems in the normal region of 600° to 700° C.

Figure 2:
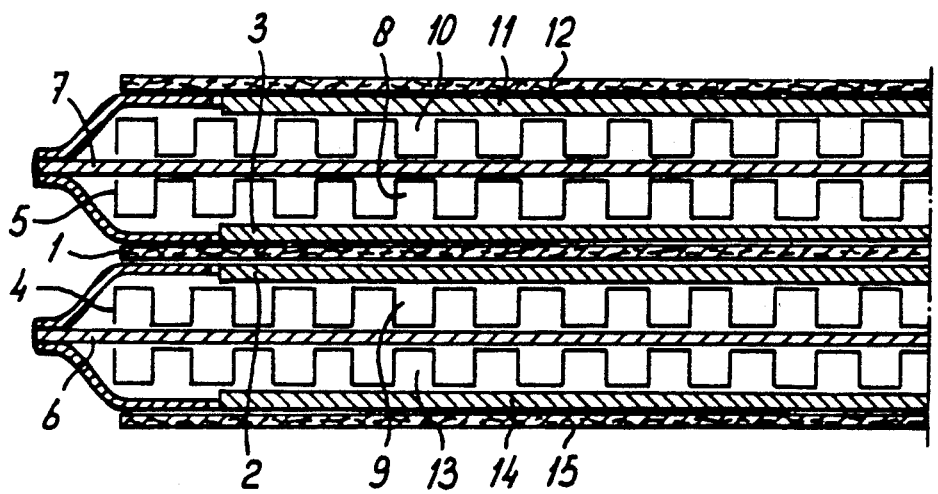
Figure 3:
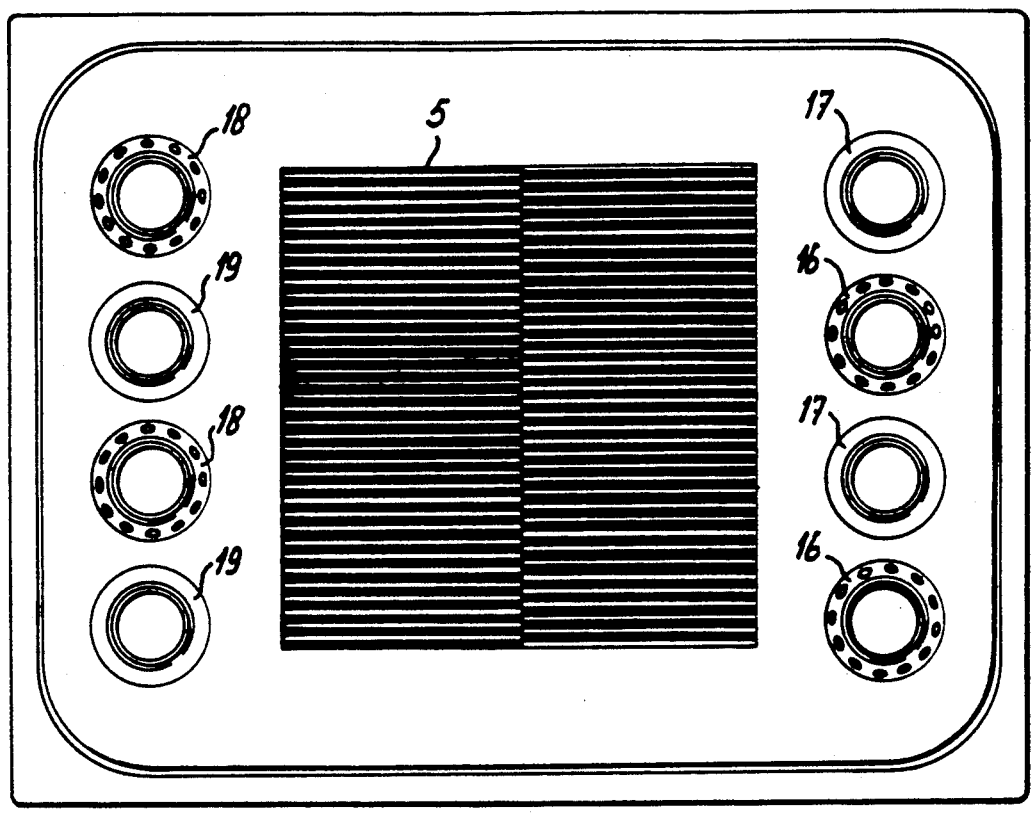
Figure 4:
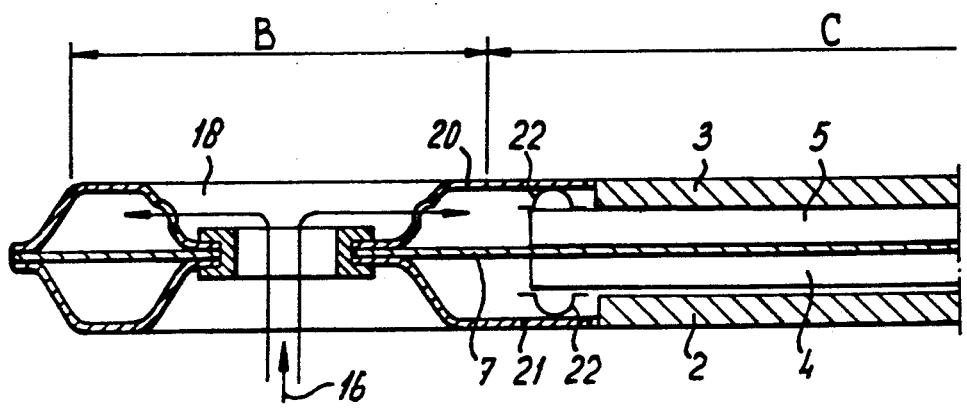
Figure 5:
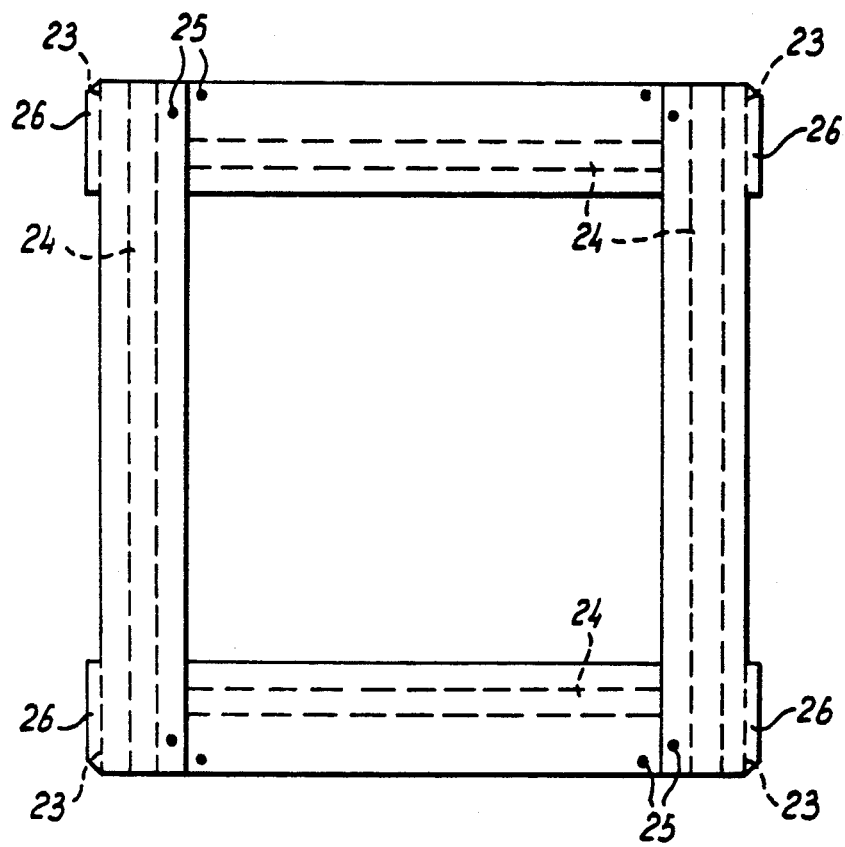
Figure 6:
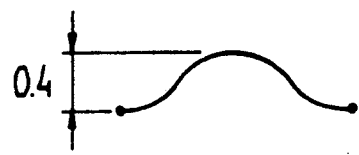
Figure 7:
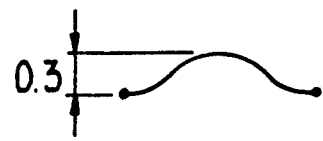

In the accompanying drawings:
FIG. 1 shows a basic diagram of a molten carbonate fuel cell;
FIG. 2 shows diagrammatically a fragmentary cross section of a cell construction having a half-cell adjoining at both sides;
FIG. 3 is a plan view of a separator plate;
FIG. 4 is an enlarged fragmentary cross section of a cell construction at a gas passage opening;
FIG. 5 is a plan view of a frame for use in a cell assembly;
FIGS. 6 and 7 show the unstressed height and the stressed height, respectively, of a separator plate; and
FIG. 8 shows a stacked assembly according to the invention.

The molten-carbonate fuel cell is composed in principle of a plate-type anode, a matrix containing electrolyte and a cathode. This so-called active assembly of the fuel cell is enclosed on either side between one or more metal plates, termed current conductor and/or separator plate, which has to provide a number of functions such as: supporting the plate-type electrodes, passing the process gases over the electrodes, uniformly distributing the process gases over the electrode surface, conducting electrons between the separate fuel cells and separating the fuel gas and the oxidizing gas between anode and cathode of adjacent fuel cells. FIG. 1 shows a basic diagram of a molten-carbonate fuel cell as described above.

In this FIGURE, 1 indicates the matrix, for example an inert material of lithium aluminate, generally 0.5 to 1 mm thick, which is impregnated with a mixture of alkali carbonates. 2 is the cathode, for example nickel oxide, generally 0.4 to 0.8 mm thick and 3 represents the anode, for example nickel chromium, generally having a thickness of 0.6 to 0.8 mm. The brittle ceramic plate-type cathode is supported by a cathode current collector 4 which also distributes the oxidizing gas stream over the cathode and also conducts the electrons from the anode of the cell situated underneath via gas separation plate to the cathode 2.

The anode 3 is supported by the anode current collector 5 which also distributes the fuel cell gas stream over the anode and conducts the electrons from the anode via the separator plate to the cathode of the fuel cell situated above.

Hydrogen is supplied to the anode from the current collector situated at the anode side and $H_2O + CO_2$ are removed therefrom.

$CO_3^{2-}$ is transported through the electrolyte matrix, while the reaction $\frac{1}{2} O_2 + CO_2 + 2e$ giving $CO_3^{2-}$ proceeds at the cathode. A mixture of $O_2$ and $CO_2$, which may in turn originate partly from the anode side, is supplied to the cathode from the current collector situated at the cathode side. FIG. 2 shows diagrammatically a possible practical embodiment of the cell construction of a molten-carbonate fuel cell described above having a half-cell adjoining at both sides. In this FIG., 1 indicates the matrix, 2 is the cathode, 3 is the anode, 4 is the cathode current collector in the form of a corrugated plate, 5 is the anode current collector, 6 is the separator plate to the anode side of the fuel cell situated below, and 7 is the separator plate to the cathode side of the fuel cell situated above. At 8 fuel is present and at 9-oxidizing agent. A cell is therefore formed by the elements 1 to 5 inclusively, plus carbonate. The flow of the oxidizing gas and of the fuel gas over the cathode or over the anode respectively takes place perpendicularly to the plane of the drawing of FIG. 2.

Above the separator plate 7, the adjacent half-cell situated above which has the cathode current collector 10, the cathode 11 and the matrix 12 is shown. In the same way, the adjacent half-cell situated below which has the anode current collector 13, the anode 14 and the matrix 15 is shown at the underside of separator plate 6.

In known cells, the interconnection of the cells is a problem. This is because, when the carbonate salt melts in the porous matrix and is received in the electrode, the volume "apparently" decreases. If the electrodes are interconnected by solid rails around the outside periphery, gaps are produced between the plate-type components as a result of shrinkage of the electrodes, as a result of which the performance of the cell declines and the efficiency is decreased or even, indeed, the operation of the cell stops completely.

A device of the type described in the preamble has now been found which is characterized in that the gas passages for the gas inlet and gas outlet are disposed in sides, situated opposite each other, of the separator plate. As a result, no sealing problems are produced by the carbonate melting and the receiving of the carbonate in the matrix and in the porous electrodes. In addition, as a result of the choice of a suitable profile of the gas passage, an elastic structure is obtained having the compression required to compensate for the shrinkage of the electrodes during the service life so that the internal resistance in the cell does not increase as a result of the formation of gaps and the performance of the cell is maintained.

A particular aspect of the discovery is the combination of the spring-loaded gas passage, described above, of the separator plate with a frame-type spring around the active cell assembly. Said "frame" spring provides the force required to seal off the process gases in the fuel cell from the environment. This frame spring may also contain built-in components for conveying the process gases.

FIG. 3 shows, as an example, a possible embodiment of such a separator plate in which 16 shows the fuel inlet pipes and 17 the oxidizing agent inlet pipes, 18 and 19 show the corresponding outlet pipes, while 5 shows a corrugated plate-type current collector. The current collector plate is, of course, not bound by this embodiment.

FIG. 4 shows a longitudinal section across the gas passage opening, in which B is the spring-loaded gas passage section and the supporting spring is situated around the active assembly in section C.

In this FIG., 7 shows a partitioning plate or separator plate, 20 and 21 the anode gas container and cathode gas container respectively, and 4 and 5 the current collectors, 2 being the cathode and 3 the anode, while the fuel inlet is 16 and the springs around the active cell assembly are indicated by 22. The function of these springs is to provide the required sealing force around the assembly in the central section of the cell. A suitable embodiment of the spring-loaded element around the active cell assembly has the form of a frame, a possible embodiment of which is shown in FIG. 5, it being possible to achieve the mutual joints by, for example, a point weld or solder joint, said frame being provided with special devices for conveying the process flows. According to the invention, the spring action of the gas passage is achieved by a suitable shape of the outflow profile.

The spring characteristic of the spring beneath the active assembly is dimensioned in such a way that it is matched to the compression of the abovementioned gas passage and applies the required force to the matrix in order to achieve effective sealing of the process gases from the environment.

FIG. 5 shows, at the points 25, a spot weld for fixing to the gas container (this may obviously also be positioned somewhat differently), 23 shows a bending line for a flow conveying device 26 and 24 shows the spring-loaded region. At the side edge, a possible embodiment of the spring construction at the anode side and the spring construction at the cathode side is shown.

FIGS. 6 and 7 show the unstressed height and the stressed height, that is to say built into the separator plate.

A stacking of fuel cells of said molten-carbonate type has now also been found which is characterized in that the cells are separated by said separator plates. The advantage is that such a stack of fuel cells is provided with a rail of spring construction around the active cell assembly.

Fuel cells of the molten carbonate type supply electricity at a relatively high current density of, for example, 150 to 160 A/cm$^2$, but at a relatively low working voltage or cell voltage of approximately 0.7–0.8 V. For practical use, fuel cells of this type are used by stacking, for example, 100 fuel cells (fuel cell stacks). The function of the partitioning plates or separator plates under these circumstances is to separate the anodes and cathodes adjacent to each other, to separate the anode gas flow (fuel) and the cathode gas flow (oxidizing agent), to distribute the two gas flows uniformly over the electrodes, and to conduct electrons between the adjacent anode and cathode.

FIG. 8 shows an assembly according to the invention in which 1 indicates the matrix, 2 the cathode, 3 the anode, 7 is a flat separator plate and 20 indicates a gas container, while 16 and 19 indicate, respectively, the process gas supplies, that is to say 16 indicates the fuel gas inlet, while 19 indicates the oxidizing agent outlet. The construction of the fuel cell stack is evident from this figure.

I claim:

1. Separator plate for stacking fuel cells of the molten-carbonate type each comprising an active cell assembly, provided with openings for fuel inlet and fuel outlet and for inlet and outlet of oxidizing agent, there being gas passages through the separator plate that have a spring characteristic as a result of choosing a suitable profile therefore, and a spring in the shape of a frame which is disposed around the active cell assembly, said spring containing built-in components for conveying the process gases, and the profile of the spring being matched to the spring characteristic of the gas passage.

2. Stack of fuel cells of the molten-carbonate type, wherein the cells are separated by separator plates according to claim 1.

3. Stack of fuel cells according to claim 2, wherein the spring comprises a rail of spring construction around the active cell assembly.

* * * * *